United States Patent
Plantan et al.

(10) Patent No.: US 9,765,835 B2
(45) Date of Patent: Sep. 19, 2017

(54) PARKING PISTON DIRECT CONNECTION TO APR ROD

(75) Inventors: Ronald S. Plantan, Mooresville, NC (US); Brett S. Darner, Wellington, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 683 days.

(21) Appl. No.: 13/247,372

(22) Filed: Sep. 28, 2011

(65) Prior Publication Data

US 2013/0075206 A1   Mar. 28, 2013

(51) Int. Cl.
| | |
|---|---|
| *F16D 65/22* | (2006.01) |
| *F16D 65/28* | (2006.01) |
| *B60T 17/08* | (2006.01) |
| *F16D 121/10* | (2012.01) |

(52) U.S. Cl.
CPC .......... *F16D 65/28* (2013.01); *B60T 17/088* (2013.01); *F16D 2121/10* (2013.01)

(58) Field of Classification Search
USPC .................. 188/153 D, 153 R, 170
See application file for complete search history.

(56) References Cited

U.S. PATENT DOCUMENTS

| | | | |
|---|---|---|---|
| 2,517,745 A | 8/1950 | Weatherhead, Jr. et al. | |
| 2,852,921 A * | 9/1958 | Ayers, Jr. | 60/557 |
| 3,302,530 A * | 2/1967 | Dobrikin et al. | 91/440 |
| 3,727,405 A * | 4/1973 | Randol | 60/552 |
| 3,813,994 A * | 6/1974 | Swander et al. | 91/471 |
| 3,983,790 A * | 10/1976 | Johannesen | 91/422 |
| 4,091,619 A * | 5/1978 | Carre et al. | 60/553 |
| 4,480,530 A * | 11/1984 | Holmes | 92/78 |
| 5,105,727 A | 4/1992 | Bowyer | |

(Continued)

FOREIGN PATENT DOCUMENTS

| | | |
|---|---|---|
| CN | 1900548 A | 1/2007 |
| CN | 101312866 A | 11/2008 |

(Continued)

OTHER PUBLICATIONS

International Search Report dated Nov. 19, 2012 (Three (3) pages).

(Continued)

*Primary Examiner* — Robert A Siconolfi
*Assistant Examiner* — James Hsiao
(74) *Attorney, Agent, or Firm* — Crowell & Moring LLP

(57) ABSTRACT

In a brake actuator including a plurality of actuator housing portions, a diaphragm seal, partially delimiting a parking brake de-actuation chamber, is retained between adjacent actuator housing portions, and an elastic element disposed between the diaphragm seal and one of the housing portions opposes expansion of the parking brake de-actuation chamber. A push rod extends into and out of a service brake actuation chamber upon respective release of fluid pressure from the parking brake de-actuation chamber and supply of fluid pressure to the parking brake de-actuation chamber. In order to constrain a central portion of the diaphragm seal for movement together with both the push rod and a piston, a clamping arrangement is used to axially clamp the central diaphragm seal portion between an end of the push rod and a surface of the piston.

20 Claims, 2 Drawing Sheets

(56) References Cited

U.S. PATENT DOCUMENTS

| | | | |
|---|---|---|---|
| 5,377,579 A * | 1/1995 | Pierce | 92/63 |
| 5,507,217 A * | 4/1996 | Plantan | 92/63 |
| 5,873,297 A * | 2/1999 | Stojic | 91/444 |
| 6,029,447 A * | 2/2000 | Stojic et al. | 60/453 |
| 6,164,187 A | 12/2000 | Stojic | |
| 6,267,043 B1 * | 7/2001 | Plantan et al. | 92/63 |
| 6,360,649 B1 | 3/2002 | Plantan | |
| 6,378,414 B1 * | 4/2002 | Constantinides et al. | 92/63 |
| 6,389,954 B1 * | 5/2002 | Constantinides et al. | 92/78 |
| 7,121,191 B1 | 10/2006 | Fisher | |
| 7,395,906 B2 * | 7/2008 | Potter et al. | 188/170 |
| 7,451,690 B2 | 11/2008 | Schrader et al. | |
| 7,493,994 B2 * | 2/2009 | Plantan et al. | 188/153 D |
| 7,513,341 B2 | 4/2009 | Lachermeier | |
| 8,011,483 B2 * | 9/2011 | Brandt et al. | 188/153 D |
| 8,100,047 B2 * | 1/2012 | Fisher et al. | 92/63 |
| 8,453,556 B2 * | 6/2013 | Plantan et al. | 92/63 |

FOREIGN PATENT DOCUMENTS

| | | |
|---|---|---|
| JP | 11-510238 | 9/1999 |
| JP | 2006-123873 | 5/2006 |
| JP | 2006-224792 | 8/2006 |
| WO | WO 97/06349 | 2/1997 |

OTHER PUBLICATIONS

Written Opinion (PCT/ISA/237) dated Nov. 19, 2012 (Six (6) pages).
International Preliminary Report on Patentability (PCT/IB/373), including Written Opinion (PCT/ISA/237) dated Apr. 1, 2014 (seven (7) pages).
Chinese Office Action issued in counterpart Chinese Application No. 201280057842.X dated Nov. 16, 2015 (seven (7) pages).
Bendix, "Bendix Piggyback Spring Brake", Service Data, SD-02-4500, pp. 1-6 (six (6) sheets).
Russian-language Office Action issued in counterpart Russian Application No. 2014116897 dated Jan. 26, 2016 with English-language translation (eight (8) pages).
Supplementary European Search Report dated Sep. 30, 2015 (Seven (7) pages).
Japanese Office Action dated Apr. 19, 2016, issued in counterpart Japanese Application No. 2014-533528, with English translation and comments (17 pages).
Mexican-language Office Action issued in counterpart Mexican Application No. 54809, dated Jul. 15, 2016, with English-language translation (eight (8) pages).

* cited by examiner

PARKING PISTON DIRECT CONNECTION TO APR ROD

CROSS REFERENCE TO RELATED APPLICATION

Cross reference is made to commonly assigned, U.S. patent application Ser. No. 12/723,337, filed Mar. 12, 2010, titled NON-THREADED METHOD FOR ASSEMBLING A CENTER HOLE PARKING DIAPHRAGM AND ADAPTER PUSH ROD WITH A CLIP AND WASHER, now U.S. Pat. No. 8,453,556, issued Jun. 4, 2013.

BACKGROUND OF THE INVENTION

Field of the Invention

The present invention concerns a brake actuator having a variable volume chamber for service brake actuation, a spring providing for parking or emergency brake actuation, and a fluid operated parking or emergency brake de-actuation chamber.

Description of Related Art

U.S. Pat. No. 5,105,727 to Bowyer concerns a brake actuating mechanism in which a caging rod or tool passes through a pressure plate. An actuator rod is press-fit into a tubular section of the pressure plate to compress an edge of a diaphragm opening against an expanded portion of the tubular section.

U.S. Pat. No. 5,377,579 to Pierce discloses a spring brake actuator in which the cylindrical section of a pressure plate has an inner wall shaped and sized to receive an end of an actuator rod in press-fit engagement.

U.S. Pat. No. 5,507,217 to Plantan discloses an inner diaphragm sealing bead clamped between a pair of diaphragm plates and secured for reciprocal movement by a bolt to a push rod.

U.S. Pat. No. 6,164,187 to Stojic relates to a spring brake actuator with a caging rod passing through a pressure plate into a hollow actuator rod. The actuator rod and a stem of the pressure plate are press-fit together to form an integral unit.

U.S. Pat. No. 6,360,649 to Plantan concerns a spring brake actuator having a lockout bolt assembly having a first portion threaded into a nut fixed relative to the cup shaped portion of a spring brake actuator housing.

Bendix Service Data Publication SD-02-4500 supplies general maintenance and service information on spring brake actuators with piggyback chambers.

SUMMARY OF THE INVENTION

A brake actuator in accordance with one embodiment of the present invention includes a plurality of actuator housing portions, a diaphragm seal, partially delimiting a parking brake de-actuation chamber, that is retained between adjacent actuator housing portions, and an elastic element disposed between the diaphragm seal and one of the housing portions to oppose expansion of the parking brake de-actuation chamber. Upon depressurization of the parking brake de-actuation chamber, a push rod extending through the parking brake de-actuation chamber is operable to produce brake actuation. The push rod extends into and out of a service brake actuation chamber upon respective release of fluid pressure from the parking brake de-actuation chamber and supply of fluid pressure to the parking brake de-actuation chamber. A piston, which is secured to and movable together with both the push rod and the diaphragm seal, acts as a seat for the elastic element. In order to constrain a central portion of the diaphragm seal for movement together with both the push rod and the piston, a clamping arrangement is used to axially clamp the central diaphragm seal portion between an end of the push rod and a surface of the piston.

In one preferred configuration, the clamping arrangement includes a screw or bolt received within a bore that extends axially into the push rod and a washer pressing against the central portion of the diaphragm seal. As the screw or bolt is tightened in the bore, the washer is withdrawn into a matching recess in the piston.

Advantages of the present invention include cost reduction and easy actuator assembly. Other advantages are likely to include some spring durability improvements and easy manual parking spring caging. Technical issues associated with parking piston movement about a conical washer and parking diaphragm seal arrangement due to lateral parking spring loads are also addressed.

The simplified design disclosed produces a robust connection between the parking diaphragm seal and the adapter push rod, eliminates assembly presses, and mitigates parking spring lateral load effects. The need for a parking pushrod return spring and a fit conical washer in existing designs is eliminated, since the central bolt used in the present arrangement preloads the parking piston to the adapter push rod, thereby both sealing the parking diaphragm to the conical washer and securing the conical washer utilized to the adapter push rod. By rigidly connecting the parking piston to the push rod, pivoting of the piston relative to the diaphragm seal is precluded.

The parking piston plate, through which the central bolt is inserted into the threaded bore of the adapter push rod, may include grooves to improve gripping of the diaphragm seal. The diaphragm moves together with the push rod and piston; this both improves sealing and reduces manufacturing steps. Fewer lateral loads are introduced to the parking piston so that the piston remains centered during cycling. Neither a clip to apply additional sealing force to the diaphragm seal nor an integral release bolt, which moves mass to the rear of the chamber, is required.

DETAILED DESCRIPTION OF THE INVENTION

Figure 1:
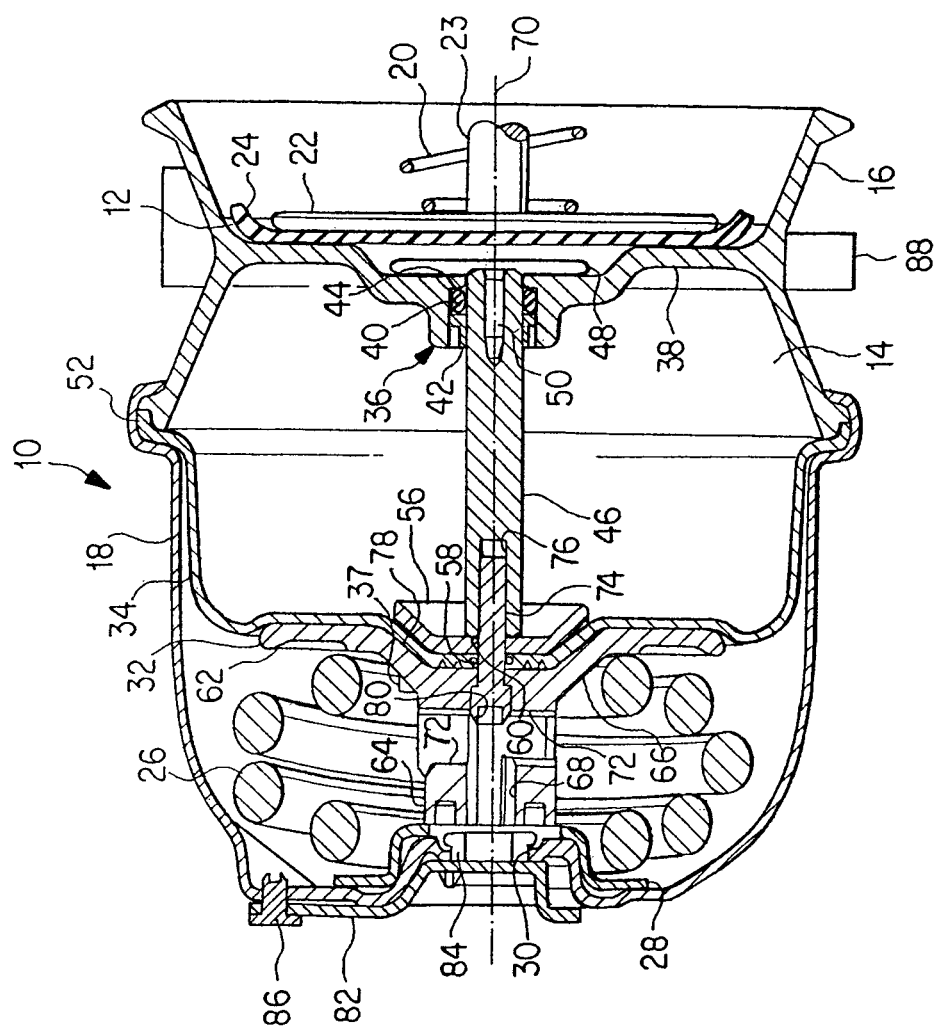
FIG. 1 is a lateral sectional view of a brake actuator configured in accordance with the present invention.

The present invention shares certain characteristics with the brake actuator arrangement forming the subject matter of U.S. Pat. No. 6,164,187 to Stojic mentioned above. The entire disclosure of the Stojic ('187) patent is incorporated herein by reference as non-essential subject matter.

The brake actuator 10 illustrated has a service brake actuation chamber 12 and a parking or emergency brake de-actuation chamber 14, and includes a first, preferably cast metal or metal alloy housing portion 16, a second housing portion (not shown) within which the service brake actuation chamber 12 is expansible and contractible, and a third housing portion 18 disposed on a side of the first housing portion 16 opposite the second housing portion. In a conventional manner, supply of fluid to the service brake actuation chamber 12 pressurizes that chamber in opposition to the force applied by a service brake return spring 20, which acts upon a force or pressure distributing element 22 for a service brake diaphragm seal 24 that partially delimits the service brake actuation chamber 12. As the second housing portion is located closest to a vehicle brake to which the actuator 10 is to be connected, it may be referred to as a "front" housing portion, while the third housing portion 18 is located farthest from the vehicle brake, and, accordingly may be referred to as a "rear" housing portion. The first housing portion 16 thus constitutes an "intermediate" housing portion, and, in FIG. 1, "front" is the direction toward the right side, and "rear" is the direction toward the left side. Expansion and contraction of the service brake actuation chamber 12, accordingly, results in frontward and rearward movement of the pressure distributing element 22 and a brake actuator rod 23 associated with that element 22 for service brake operation and release.

Operating elements of the brake actuator 10 include a parking or emergency brake actuator spring 26 that has one end abutting a first actuator spring seat formed by a reinforcement plate 28, disposed within the third housing portion 18 around a central housing portion opening 30. An opposite end of the parking or emergency brake actuator spring 26 rests on a second actuator spring seat defined by the rear-facing side of a parking piston 32. A parking brake diaphragm seal 34 engages on a front-facing side of the parking piston 32 and partially delimits the parking or emergency brake de-actuation chamber 14.

A seal arrangement 36 cooperates with a radially extending wall 38 of the first housing portion 16. As illustrated, the seal arrangement 36 includes an o-ring 40 pressed by a retaining collar 42 against a shoulder 44. The o-ring 40 extends circumferentially around a central aperture in the wall 38, so that the seal arrangement 36 cooperates with the outer surface of an adapter push rod 46, displaceable through the central aperture, to fluid-tightly separate the service brake actuation chamber 12 from the parking or emergency brake de-actuation chamber 14. Movement of the adapter push rod 46 through the central aperture in the wall 38 will occur upon release of fluid from the parking or emergency brake de-actuation chamber 14 as will be described. A ring or plate 48 serves as a force or pressure distributing element for the service brake diaphragm seal 24 upon release of fluid from the parking or emergency brake de-actuation chamber 14. The ring or plate 48 is secured by a screw 50 or other such fastener to a front end of the adapter push rod 46. It is to be understood that the parking or emergency brake actuator spring 26 could be either a coil spring, as illustrated, or any other type of elastic element that provides the energy storage and return functions required by a parking brake actuator, such as multiple coil springs, leaf springs, cantilevered springs, resilient blocks, or chargeable high pressure bladders.

The radial outer circumference 52 of the parking brake diaphragm seal 34 defines an outer edge that is clamped between adjacent ends or sections of the intermediate and rear housing portions 16, 18, while the radial inner edge 54 of the parking brake diaphragm seal 34 is retained on an end of the adapter push rod 46 in a manner to be described. The brake de-actuation chamber 14 is thus defined within a volume delimited by the first housing portion 16, the parking brake diaphragm seal 34, a conical washer 56, an optional central o-ring seal 58, the seal arrangement 36, and the adapter push rod 46.

The brake de-actuation chamber 14 is shown in FIG. 1 in an operational condition, with the parking piston 32 in a fully withdrawn position. This position is achieved when sufficient pneumatic pressure to overcome the spring force developed by the parking or emergency brake actuator spring 26 has been supplied, via a supply port (not illustrated), to the chamber 14. Opposite the brake de-actuation chamber 14, the third housing portion 18 is vented to atmosphere, for example by way of wall openings in that third housing portion.

The service brake diaphragm seal 24 may be attached at its outer circumference (not shown) between adjacent ends of the intermediate housing portion 16 and the front housing portion in a manner similar to that in which the radial outer circumference 52 of the seal 34 is attached between adjacent ends of the intermediate and rear housing portions 16 and 18. The brake actuator rod 23 abuts against, is attached to, and/or is formed together with a central area of the pressure distributing element 22.

With a service brake actuation chamber 12 configured as shown in FIG. 1, actuation and release of a vehicle service brake can be effected, when the vehicle is running and the parking or emergency brake de-actuation chamber 14 is pressurized, by supplying air through an appropriate feed line to the service brake actuation chamber 12 and discharging the air supplied to the chamber 12, respectively. Increasing pressurization of the chamber 12 results in a force acting on the element 22, which overcomes the force applied by the return spring 20, thereby moving the brake actuator rod 23 in a brake application direction, i.e. to the right in FIG. 1. Decreasing pressurization of the chamber 12, of course, permits movement of the rod 23 and the element 22 in an opposite, service brake release direction, i.e. to the left in FIG. 1.

When a brake fluid supply system failure occurs, or when the vehicle is no longer running, the parking or emergency brake de-actuation chamber 14 is depressurized. A pressure loss in the chamber 14 permits the parking or emergency brake actuator spring 26 to expand, thereby displacing the parking piston 32 toward the second housing portion, i.e. toward the front of the actuator 10. The parking piston 32 is seated on the parking brake diaphragm seal 34, which, in turn, is seated on the conical washer 56 retained in position on the adapter push rod 46 by way of a shoulder 60. As the parking or emergency brake actuator spring 26 is stronger than the return spring 20, for example by having a force constant which is greater than that of the return spring 20, the push rod 46 is displaced through the aperture in the wall 38 receiving the seal arrangement 36 to the right in FIG. 1 and, in turn, displaces the element 22 and the brake actuator rod 23 in a brake application direction. Pressurizing the chamber 14 again, upon fluid supply system repair or when the vehicle is again running, displaces the push rod 46 in an opposite direction, compresses the spring 26, and discontinues parking or emergency brake application. During normal vehicle operation, the parking or emergency brake actuator spring 26 remains compressed, and service brake application and release is performed by respective pressurization of and relief of fluid pressure from the service brake actuation chamber 12.

A conventional caging bolt (not shown) is used in conjunction with a threaded nut (not shown) to retain the manual parking or emergency brake actuator spring 26 in a compressed condition during servicing or in other situations when the chamber 14 is de-pressurized. Advantages provided by the present invention during caging operations will be discussed.

Figure 2:
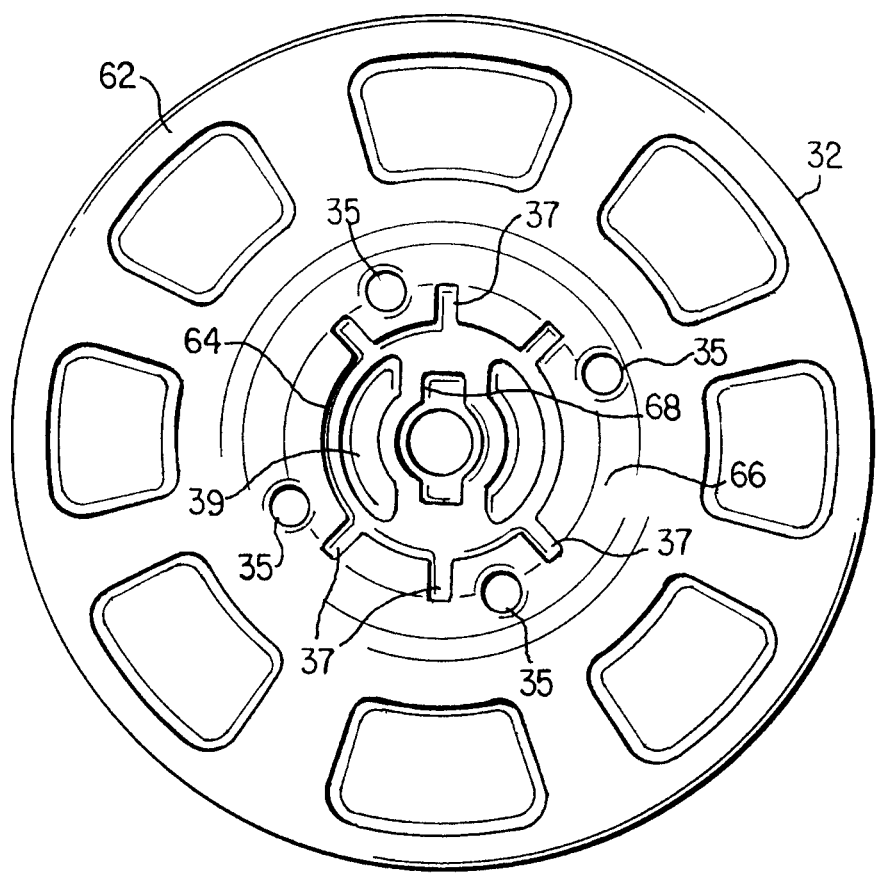
FIG. 2 is an end view of a parking piston usable in the overall brake actuator shown in FIG. 1.

The parking piston 32 includes an approximately disk-like outer circumferential section 62, an upstanding central section 64, and an approximately conical intermediate section 66 disposed between the outer and central sections 62 and 64. The parking piston 32 is provided with several passageways, including an axial passageway 68 in the central section 64. The axial passageway 68 is aligned with a longitudinal axis 70 of the brake actuator 10 and, as is best seen in FIG. 2, has an oblong cross section. The axial passageway 68 opens into approximately sector shaped openings 72 extending laterally within the central section 64. Walls of the sector shaped openings 72 cooperate with the T-shaped end of a parking spring caging bolt or other such release tool (not shown) when the parking or emergency brake actuator spring 26 is to be mechanically compressed and rendered inoperative.

In addition to the passageway 68 mentioned, the outer circumferential section 62, the upstanding central section 64, and the intermediate section 66 of the parking piston 32 are indicated in FIG. 2. FIG. 2 also shows spring end coil positioning projections 35, reinforcing ribs 37 extending between and formed together with the central and intermediate sections 64 and 66, and optional bearing protrusions 39 for supporting the reinforcement plate 28.

A central bolt 74 is utilized to securely interconnect the parking piston 32, an interior central portion of the parking brake diaphragm seal 34, the conical washer 56, and the adapter push rod 46 together. To interconnect the elements mentioned, a threaded shank of the bolt 74 is passed through aligned central holes in the parking piston 32, the diaphragm seal 34, and the washer 56, and into a threaded bore 76 extending axially into the adapter push rod 46. The conical washer 56 is fixed in position relative to the adapter push rod 46 by way of the shoulder 60 mentioned previously. Consequently, as the bolt is screwed into the bore 76 and tightened, the conical washer 56 is withdrawn into a matching recess 78 formed in the parking piston 32 to clamp the interior central portion of the diaphragm seal 34 against the surface of the recess 78. An overall clamping arrangement, including the washer 56, the shoulder 60, the bolt 74, and the bore 76, thus operates to constrain the central diaphragm seal portion for movement with both the push rod 46 and the piston 32. A suitable tool may be inserted through the a central opening 30 and through the axial passageway 68 to rotate the bolt 74; in the particular arrangement illustrated, a hexagonal recess 80 is provided in the head of the bolt 74 to receive a correspondingly configured Allen wrench. After the parking piston 32, the interior portion of the parking brake diaphragm seal 34, the conical washer 56, and the adapter push rod 46 are securely interconnected by the bolt 74, a dust plug 82 may be placed over the central housing portion opening 30 to avoid contamination of the volume within the third housing portion 18. The parking piston 32 may include grooves on its front facing side to improve gripping of the diaphragm seal 34. Clips 84 receivable within the opening 30, rivets 86 interconnecting the dust plug 82 and the third housing portion 18, or both such rivets and clips may be used to secure the dust plug in position over the opening 30. The overall brake actuator 10 may be secured to a vehicle by way of a connection element 88 formed with or connected to the first housing portion 16.

In this way, a simplified spring brake actuator arrangement that eliminates the need for a parking pushrod return spring, provides a robust connection of the parking piston 32 to the adapter push rod 46, and eliminates the need to press fit the conical washer on the push rod 46 is provided. The central bolt 74 preloads the parking piston 32 to adapter push rod 46, sealing the parking brake diaphragm seal 34 to the conical washer 56 while securing conical washer 56 to the push rod 46. Since the assembly relies only on the torque of the central bolt 74 for interconnection, the two assembly presses now required for assembly in existing arrangements can be replaced by a single assembly bolt torquing station. Reduced labor and plant assembly tooling will result in cost reduction.

Another advantage to having the parking piston 32 fixed to the adapter push rod 46 include distribution of loads imposed on the third housing portion 18. After the parking or emergency brake actuator spring 26 is fully compressed by way of air supplied at approximately 70-75 psi to the parking or emergency brake de-actuation chamber 14, additional loads at higher air pressure (typically 120 psi) that are normally imposed on the third housing portion 18 can be shared by the ring or plate 48 secured to the front end of the adapter push rod 46 as the ring or plate 48 pulls on the radially extending wall 38 of the first cast metal or metal alloy or stamped housing portion 16. This will reduce fatigue loads and could lead to elimination of the reinforcement plate 28. The counterbalance of force obtained by providing the combination of the push rod 46 and the piston 32 with air pressure assistance could result, for example, in an approximately 30% reduction in force on the spring brake housing portion 18.

Due to the interconnection provided by the bolt 74 and the threaded bore 76 in the adapter push rod 46, when the parking or emergency brake actuator spring 26 is manually caged, the adapter push rod 46 is pulled back to the zero stroke position, together with the parking piston 32, by way of the T-shaped end of the parking spring caging bolt or other release tool. In the arrangement forming the subject matter of commonly assigned, co-pending U.S. patent application Ser. No. 12/723,337, by contrast, the adapter push rod will not fully retract during such a procedure, potentially exposing a significant portion of the push rod to dirt and contamination during shipping and storage prior to service section connection in the field.

Since the parking piston 32 of this invention is rigidly connected to the adapter push rod 46, essentially all pivoting of the piston 32 relative to the parking brake diaphragm seal 34 is eliminated. Any power spring introduces some lateral loads to an associated piston and spring housing during cycling. These loads cause pivoting of the piston about the diaphragm interface, which can lead to diaphragm interface abrasion. Such pivoting also increases misalignment of the piston relative to the spring housing during caging, which both increases stresses in the spring and increases misalignment of the parking piston during manual parking spring caging operations. This misalignment, in turn, makes it more difficult to insert the parking spring caging bolt for manual caging.

It will also be recognized that the housing portions 16 and 18 and the elements associated therewith constitute a safety brake arrangement that can be connected to or retrofit with a separate service brake arrangement formed by the service brake diaphragm seal 24 and other elements to the front of that diaphragm seal 24.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:
1. A brake actuator comprising:
 a plurality of actuator housing portions,
 a service brake diaphragm seal that, together with one of the actuator housing portions, partially delimits a ser- vice brake actuation chamber to be expanded and contracted by fluid supply and relief, a parking brake diaphragm seal, partially delimiting a parking brake de-actuation chamber that is separate from the service brake actuation chamber and is also to be expanded and contracted by fluid supply and relief, retained between another of the actuator housing portions adjacent to said one of the actuator housing portions, an elastic element disposed between the parking brake diaphragm seal and the other of the housing portions to oppose expansion of the parking brake de-actuation chamber, a push rod operable to produce brake actuation upon depressurization of the parking brake de-actuation chamber, the push rod extending through the parking brake de-actuation chamber, a piston, secured to and movable together with the push rod, secured to and movable with the parking brake diaphragm seal, and acting as a seat for the elastic element, and a clamping arrangement including a threaded member passing through a central hole in the parking brake diaphragm seal to axially clamp the parking brake diaphragm seal to the push rod and against a surface of the piston and constrain the parking brake diaphragm seal for movement with both the push rod and the piston.

2. The brake actuator of claim 1, wherein the threaded member is received within a bore.

3. The brake actuator of claim 2, wherein the bore extends axially into the push rod.

4. The brake actuator of claim 2, wherein the clamping arrangement further includes a washer within said parking brake de-actuation chamber pressing against the central portion of the parking brake diaphragm seal.

5. The brake actuator of claim 4, wherein the washer is moved into a matching recess in the piston as the threaded member is tightened in the bore.

6. The brake actuator of claim 1, wherein the push rod extends into and out of said service brake actuation chamber upon release of fluid pressure from said parking brake de-actuation chamber and supply of fluid pressure to said parking brake de-actuation chamber, respectively.

7. The brake actuator of claim 1, wherein the clamping arrangement further includes a washer pressing against the central portion of the diaphragm seal.

8. The brake actuator of claim 7, wherein the washer is moved into a matching recess in the piston as the threaded member is tightened.

9. The brake actuator of claim 2, wherein the push rod extends into and out of said service brake actuation chamber upon release of fluid pressure from said parking brake de-actuation chamber and supply of fluid pressure to said parking brake de-actuation chamber, respectively.

10. The brake actuator of claim 4, wherein the push rod extends into and out of said service brake actuation chamber upon release of fluid pressure from said parking brake de-actuation chamber and supply of fluid pressure to said parking brake de-actuation chamber, respectively.

11. A safety brake arrangement and a service brake arrangement together defining a brake actuator, comprising:
a plurality of actuator housing portions,
a service brake diaphragm seal that, together with one of the actuator housing portions, partially delimits a service brake actuation chamber to be expanded and contracted by fluid supply and relief, a parking brake diaphragm seal, partially delimiting a parking brake de-actuation chamber that is separate from the service brake actuation chamber and is also to be expanded and contracted by fluid supply and relief, retained between another of the actuator housing portions adjacent to said one of the actuator housing portions, an elastic element disposed between the parking brake diaphragm seal and the other of the housing portions to oppose expansion of the parking brake de-actuation chamber, a push rod operable to produce brake actuation upon depressurization of the parking brake de-actuation chamber, the push rod extending through the parking brake de-actuation chamber, a piston, secured to and movable together with the push rod, secured to and movable with the parking brake diaphragm seal, and acting as a seat for the elastic element, and a clamping arrangement including a threaded member passing through a central hole in the parking brake diaphragm seal to axially clamp the parking brake diaphragm seal to the push rod and against a surface of the piston and constrain the parking brake diaphragm seal for movement with both the push rod and the piston.

12. The safety brake and service brake arrangements of claim 11, wherein the threaded member is received within a bore.

13. The safety brake and service brake arrangements of claim 12, wherein the bore extends axially into the push rod.

14. The safety brake and service brake arrangements of claim 12, wherein the clamping arrangement further includes a washer within said parking brake de-actuation chamber pressing against the central portion of the parking brake diaphragm seal.

15. The safety brake and service brake arrangements of claim 14, wherein the washer is moved into a matching recess in the piston as the threaded member is tightened in the bore.

16. The safety brake and service brake arrangements of claim 11, wherein the push rod extends into and out of said service brake actuation chamber upon release of fluid pressure from said parking brake de-actuation chamber and supply of fluid pressure to said parking brake de-actuation chamber, respectively.

17. The safety brake and service brake arrangements of claim 11, wherein the clamping arrangement further includes a washer pressing against the central portion of the diaphragm seal.

18. The safety brake and service brake arrangements of claim 17, wherein the washer is moved into a matching recess in the piston as the threaded member is tightened.

19. The safety brake and service brake arrangements of claim 12, wherein the push rod extends into and out of said service brake actuation chamber upon release of fluid pressure from said parking brake de-actuation chamber and supply of fluid pressure to said parking brake de-actuation chamber, respectively.

20. The safety brake and service brake arrangements of claim 14, wherein the push rod extends into and out of said service brake actuation chamber upon release of fluid pressure from said parking brake de-actuation chamber and supply of fluid pressure to said parking brake de-actuation chamber, respectively.

* * * * *